(12) United States Patent
Uchida et al.

(10) Patent No.: US 10,305,077 B2
(45) Date of Patent: May 28, 2019

(54) CYLINDRICAL LITHIUM-ION SECONDARY BATTERY

(71) Applicant: PANASONIC INTELLECTUAL PROPERTY MGMT CO., LTD., Osaka-shi, Osaka (JP)

(72) Inventors: Noriyuki Uchida, Osaka (JP); Yasutaka Kogetsu, Osaka (JP); Koki Inoue, Osaka (JP); Tsutomu Nishioka, Osaka (JP)

(73) Assignee: PANASONIC INTELLECTUAL PROPERTY MGMT CO., LTD., Osaka (JP)

( * ) Notice: Subject to any disclaimer, the term of this patent is extended or adjusted under 35 U.S.C. 154(b) by 13 days.

(21) Appl. No.: 15/310,192

(22) PCT Filed: May 27, 2015

(86) PCT No.: PCT/JP2015/002681
§ 371 (c)(1),
(2) Date: Nov. 10, 2016

(87) PCT Pub. No.: WO2015/182136
PCT Pub. Date: Dec. 3, 2015

(65) Prior Publication Data
US 2017/0141370 A1 May 18, 2017

(30) Foreign Application Priority Data
May 30, 2014 (JP) .................................. 2014-112098

(51) Int. Cl.
*H01M 4/02* (2006.01)
*H01M 2/12* (2006.01)
(Continued)

(52) U.S. Cl.
CPC ......... *H01M 2/1241* (2013.01); *H01M 2/023* (2013.01); *H01M 2/046* (2013.01);
(Continued)

(58) Field of Classification Search
CPC ...................................................... H01M 4/02
See application file for complete search history.

(56) References Cited

U.S. PATENT DOCUMENTS

| 5,998,051 A | 12/1999 | Poirier et al. | |
|---|---|---|---|
| 2011/0305946 A1* | 12/2011 | Moride | H01M 2/043 429/185 |

(Continued)

FOREIGN PATENT DOCUMENTS

| CN | 1268254 A | 9/2000 |
|---|---|---|
| CN | 101257100 A | 9/2008 |

(Continued)

OTHER PUBLICATIONS

International Search Report dated Aug. 18, 2015, issued in counterpart application No. PCT/JP2015/002681. (2 pages).
(Continued)

*Primary Examiner* — Jacob B Marks
(74) *Attorney, Agent, or Firm* — Westerman, Hattori, Daniels & Adrian, LLP

(57) ABSTRACT

A small cylindrical lithium-ion secondary battery provided with a safety mechanism that enables internal pressure to be released when an anomaly occurs. The battery includes an electrode group formed of a positive electrode and a negative electrode that are wound or stacked with a separator interposed therebetween, an electrolytic solution, a battery case that contains the electrode group and the electrolytic solution, and a sealing body. The battery case has an outer diameter of 10 mm or less. The sealing body includes a ring having a through-hole and includes a sheet-like or film-like (Continued)

valve member disposed such that the valve member covers the through-hole of the ring, and a safety mechanism that causes the valve member to cleave when the internal pressure reaches a predetermined pressure is disposed therein. The ring includes protrusions formed of linear ridge lines that protrude toward an inside of the through-hole.

9 Claims, 2 Drawing Sheets

(51) Int. Cl.
    *H01M 10/0525*    (2010.01)
    *H01M 2/02*    (2006.01)
    *H01M 2/04*    (2006.01)

(52) U.S. Cl.
    CPC ..... *H01M 2/0413* (2013.01); *H01M 10/0525* (2013.01); *H01M 2200/20* (2013.01); *H01M 2220/30* (2013.01)

(56) References Cited

U.S. PATENT DOCUMENTS

2013/0323544 A1* 12/2013 Kugino ............... H01M 2/1229
                                                                       429/53

2014/0377599 A1* 12/2014 Shimizu ................. H01M 2/02
                                                                       429/53

FOREIGN PATENT DOCUMENTS

| CN | 201556648 U | 8/2010 |
| --- | --- | --- |
| JP | 3-116651 A | 5/1991 |
| JP | 7-130346 A | 5/1995 |
| JP | 10-172528 A | 6/1998 |
| JP | 2000-036294 A | 2/2000 |
| JP | 2004-014217 A | 1/2004 |
| JP | 2004-172012 A | 6/2004 |
| JP | 2009-193862 A | 8/2009 |
| JP | 2014-71987 A | 4/2014 |
| JP | 2014-071987 A | 4/2014 |

OTHER PUBLICATIONS

English translation of Search Report dated Jun. 5, 2018, issued in counterpart Chinese Application No. 201580022368.0. (3 pages).
Office Action dated Mar. 28, 2019, issued in Japanese Patent Application No. 2016-523152, with English machine translation.

* cited by examiner

Figure 3
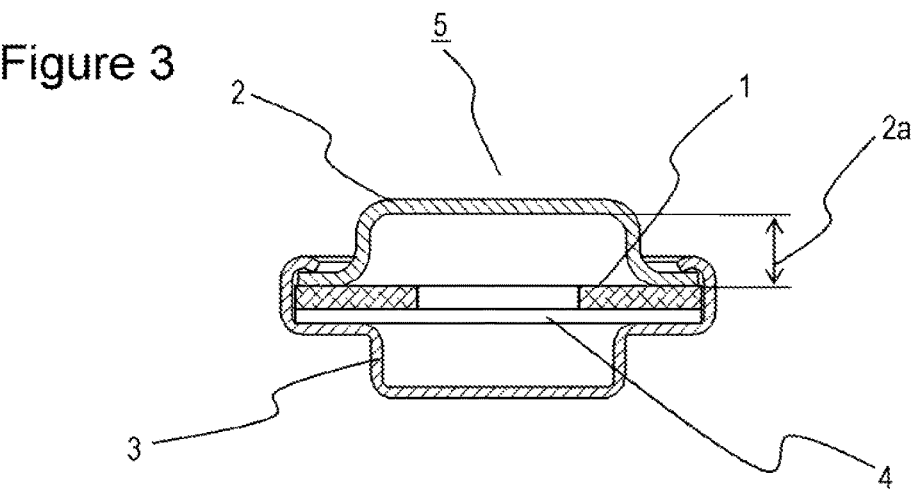
Figure 4
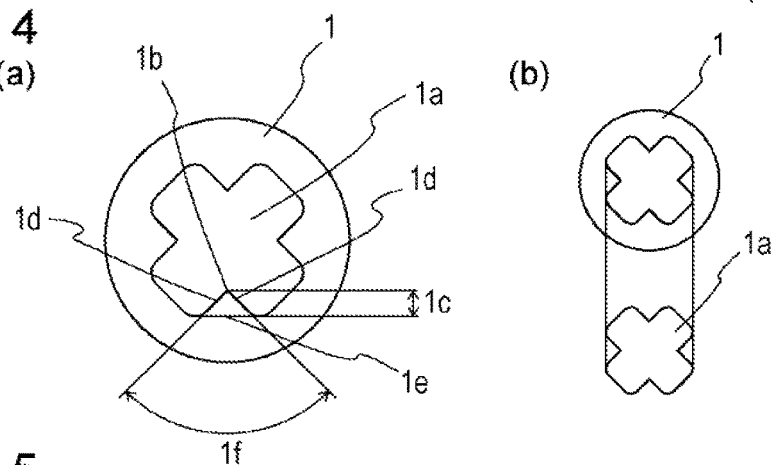
Figure 5

CYLINDRICAL LITHIUM-ION SECONDARY BATTERY

TECHNICAL FIELD

The present invention relates to a safety mechanism of a cylindrical lithium-ion secondary battery including a battery case whose outer diameter is 10 mm or less.

BACKGROUND ART

In recent years, there has been an increasing need for batteries that supply power to wearable equipment such as a smart watch, a wearable health monitor, and smart glasses, and there has accordingly been a need for small lithium-ion secondary batteries that are safer and have a high capacity.

Examples of a battery installed in wearable equipment include a small laminate lithium-ion secondary battery and a cylindrical lithium-ion secondary battery. The cylindrical lithium-ion secondary battery is required to prevent bursting thereof due to an increase in internal pressure of the battery during abnormal functioning (for example, when an active material or an electrolytic solution is decomposed to produce gas).

With regard to a cylindrical lithium-ion battery having a typical size (for example, a size of 18650), PTL 1 discloses a method of deforming a valve member toward a through-hole as a result of pressure being applied to a portion formed of a ring including the valve member and the through-hole for cleaving the valve member when the internal pressure of the battery increases and causing the valve member to cleave when the pressure reaches a predetermined pressure.

Protrusions are formed so as to extend toward the inside of the through-hole of the ring that supports the valve member. In this case, stress is concentrated on the valve member at the tip of the protrusions when the internal pressure increases. Accordingly, the valve member cleaves at a normal pressure with certainty, the gas produced in the inside of the battery can thereby be released, and bursting of the battery can be avoided. Consequently, operating pressure can be decreased even when the area of the valve member is small.

With regard to a prismatic lithium-ion battery, PTL 2 discloses a structure for cleavage in which a protrusion is disposed so as to extend in the direction perpendicular to a three-layered laminate cover and is caused to stick in a surface of the laminate cover.

CITATION LIST

Patent Literature

PTL 1: Japanese Published Unexamined Patent Application No. 7-130346
PTL 2: Japanese Published Unexamined Patent Application No. 3-116651

SUMMARY OF INVENTION

Technical Problem

As disclosed in PTL 1, the opening shape of the through-hole of the ring has pointed portions protruding toward the inside of the through-hole. In the case where protrusions are formed by forming a combination of circular holes, the protrusions need to be pointed and have a sufficient mechanical strength to be resistant to stress in order to break through the valve member.

However, in the case where the size (diameter) of the battery is decreased in the structure disclosed in PTL 1, the through-hole needs to have a predetermined area to cleave the valve member. Accordingly, the opening area ratio of the through-hole of the ring increases, and it is difficult to ensure that the ring has sufficient strength.

In addition, a decrease in the outer diameter of the battery necessitates a decrease in the size of the ring and the valve member. This decreases the area of the valve member to which a pressure is applied when the internal pressure increases. Consequently, as the pressure needed to cleave the valve member increases, it is difficult to release the internal pressure of the battery at a normal pressure with certainty, and the battery may burst.

The through-hole is formed in a manner in which two circular holes are bored such that the ring includes the protrusions. Accordingly, the size of the holes for forming the through-hole of the ring needs to be increased to ensure a sufficient size of the protrusions to cleave the valve member, and it is difficult for the size of the battery to be decreased. In the case where the through-hole of the ring is formed with an increased number of the circular holes for forming the through-hole, the number of processes increases, and the ring may be deformed when the through-hole is formed.

PTL 2 discloses a method for mainly improving the sealability of an engagement portion by using a tapered opening portion with the structure for cleavage in which the protrusion is disposed so as to extend in the direction perpendicular to the three-layered laminate cover and is caused to stick in the surface of the laminate cover, but does not disclose an effective method for cutting the laminate cover.

To solve the above problem, an object of the present invention is to provide a small cylindrical lithium-ion secondary battery installed in wearable equipment with a safety mechanism that enables the internal pressure of the battery to be released when an anomaly occurs in the battery.

Solution to Problem

The present invention provides a cylindrical lithium-ion secondary battery including an electrode group formed of a positive electrode and a negative electrode that are wound or stacked with a separator interposed therebetween, an electrolytic solution, a battery case that contains the electrode group and the electrolytic solution, and a sealing body that seals the battery case and an insulating gasket. The battery case has an outer diameter of 10 mm or less. The sealing body includes a ring having a through-hole and includes a sheet-like or film-like valve member disposed such that the valve member covers the through-hole of the ring, and a safety mechanism that causes the valve member to cleave when internal pressure of the battery reaches a predetermined pressure is disposed therein. The ring includes protrusions that protrude toward an inside of the through-hole. The protrusions are formed of linear ridge lines.

Advantageous Effects of Invention

The present invention can provide a reliable cylindrical lithium-ion secondary battery in which the internal pressure of the battery is released at a normal pressure by using the valve member having good sealability and sufficient strength even when the cylindrical lithium-ion secondary battery is a small battery including a battery case whose outer diameter is 10 mm or less, and various components also need to be small.

BRIEF DESCRIPTION OF DRAWINGS

FIG. 3 is a sectional view of a sealing body according to the embodiment of the present invention.

FIG. 4(a) is a schematic view of a ring according to the embodiment of the present invention, and FIG. 4(b) schematically illustrates the area of the ring and the area of a through-hole of the ring according to the embodiment of the present invention.

FIG. 5 schematically illustrates the shape of the ring of each battery in examples of the present invention.

DESCRIPTION OF EMBODIMENTS

Figure 1:
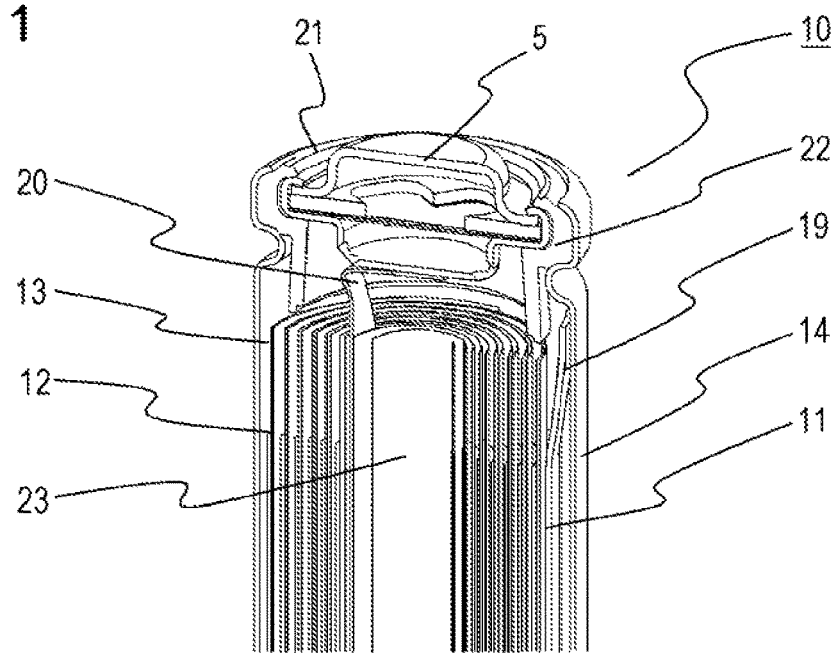
FIG. 1 is a sectional top view of a cylindrical lithium-ion secondary battery according to an embodiment of the present invention.

The present invention provides a cylindrical lithium-ion secondary battery including an electrode group formed of a positive electrode and a negative electrode that are wound or stacked with a separator interposed therebetween, an electrolytic solution, a battery case that contains the electrode group and the electrolytic solution, and a sealing body that seals the battery. The battery case has an outer diameter of 10 mm or less. The sealing body includes a ring having a through-hole and includes a sheet-like or film-like valve member disposed such that the valve member covers the through-hole of the ring, and a safety mechanism that causes the valve member to cleave when internal pressure of the battery reaches a predetermined pressure is disposed therein. The ring includes protrusions that protrude toward the inside of the through-hole. The protrusions are formed of linear ridge lines.

According to the present invention, the protrusions are formed on the ring that has a small outer diameter and a large opening portion, and the ridge line of the protrusions is a straight line. Accordingly, a sufficient mechanical strength of the protrusions is ensured, and the valve member can cleave with certainty when the internal pressure of the battery reaches a predetermined pressure even in the case where the battery is small.

The protrusions thus formed enable the valve member to cleave with certainty and enable a valve action to be performed when the internal pressure increases and the valve member is bent or anisotropically deformed. When the ridge line of the protrusions is a straight line, protrusions having a pointed tip and a large height can be disposed and firmly supported on the circumference of the ring.

That is, in the case where the ridge line of the protrusions formed on the ring of the battery whose outer diameter is 10 mm or less is a straight line, the protrusion tip can be pointed, a sufficient width and strength of the protrusions can be ensured, and the valve member can cleave with certainty to ensure safety.

It is to be noted that, in the case where the ridge line of the protrusions is a curved line, the angle of the protrusion tip becomes too small to maintain its strength, a sufficient height of the protrusions cannot be ensured, or a sufficient area of the through-hole cannot be ensured. Accordingly, in some cases, the valve member does not cleave with certainty.

The opening area ratio of the through-hole of the ring is preferably no less than 0.2 and no more than 0.7, because this ensures a sufficient area of the valve member to which the internal pressure is applied even when the outer diameter of the ring is 10 mm or less, and the valve member can cleave at the normal operating pressure with certainty.

When the opening area ratio of the through-hole of the ring is less than 0.2, there is a risk of the pressure being insufficient to cleave the valve member. When the opening area ratio is more than 0.7, there is a risk of the ring deforming due to a decrease in the strength, which may result in the valve member failing to cleave.

The opening area ratio of the through-hole is calculated by using the following expression:

Opening area ratio=through-hole area/(ring area+ through-hole area)

The material of the ring is preferably at least one selected from the group consisting of a metal, a ceramic, and a metallic compound, because this material ensures sufficient strength of the ring and enables the ring to have corrosion resistance against an electrolyte.

The valve member is preferably a multilayer body of a resin and a metal, because this ensures sealability at the boundary between the ring and the valve member and the boundary between the valve member and a lower lid.

The ring preferably includes no less than 2 and no more than 8 of the protrusions, because this ensures the proper height and strength of the protrusions.

In the case where the ring has no protrusions, the starting point of the cleavage cannot be assigned to be a specific location, and the pressure at which the valve member cleaves increases. In the case where one protrusion is formed on the ring, stress concentration occurs at the protrusion of the ring on the valve member at a single point when the internal pressure increases, and accordingly, the operating pressure cannot be sufficiently decreased. In addition, the valve member may be anisotropically deformed when the internal pressure increases, and a sufficient stress concentration does not occur at the protrusion tip. Consequently, the operating pressure of the valve member becomes unstable.

In the case where 9 or more of the protrusions are formed on the ring, the height of the protrusions is low, the stress concentration on the valve member at the protrusion tip is suppressed, the operating pressure of the valve member increases, a space for forming the protrusions is narrow, and processing on the ring is difficult. Accordingly, this is not preferable.

In the case where the protrusions formed on the ring are arranged so as to be rotationally symmetric, the protrusions are arranged at regular intervals, and stress concentration occurs uniformly on the valve member on the circumference of the ring when the internal pressure increases. Accordingly, the valve member cleaves with certainty, and the operating pressure of the valve member becomes stable. Accordingly, this is preferable. In the case where the protrusions are arranged so as not to be rotationally symmetric, the valve member may be anisotropically deformed in an area in which no protrusions are disposed, and the operating pressure of the valve member may increase.

When the angle of the tip of the protrusions formed on the ring is no less than 60° and no more than 120°, the protrusions have sufficient strength to inhibit the protrusion tip from being deformed, even when the valve member is subjected to an increased internal pressure and stress concentration occurs at the tip of the protrusions, stress concentration occurs on the valve member at the protrusion tip when the internal pressure increases, and the effect of the starting point is obtained. Accordingly, this is preferable.

In the case where the angle of the tip of the protrusions is less than 60°, the deformation of the protrusions reduces the effect of the starting point for cleaving the valve member. In the case where the angle of the tip of the protrusions is more than 150°, the stress concentration on the valve member at the protrusion tip becomes insufficient when the internal pressure increases, the operating pressure of the valve member increases, and the effect of the starting point is reduced. Accordingly, this is not preferable.

When the protrusions of the ring have a height of no less than 0.25 mm and no more than 2.5 mm, stress concentration is likely to occur on the valve member at the protrusion tip when the internal pressure increases, and the operating pressure of the valve member decreases and is stable. Accordingly, this is preferable.

When the height of the protrusions is less than 0.25 mm, the stress concentration at the protrusion tip is insufficient, and the operating pressure of the valve member increases. When the height of the protrusions is more than 2.5 mm, the protrusions are large with respect to the outer diameter of the battery, and it is difficult for the size of the battery to be decreased. Accordingly, this is not preferable.

A pressure at which the valve member cleaves when the internal pressure of the battery reaches a predetermined pressure is preferably no less than 1 MPa and no more than 10 MPa. When the pressure at which the valve member cleaves is 1 MPa or more, an increase in the internal pressure can be avoided in an early stage when an anomaly occurs in the battery. When the pressure is 10 MPa or less, bursting of the battery case can be avoided. The pressure is preferably determined such that gas released during valve action does not cause the battery to scatter depending on the use and size of the battery.

An embodiment of the present invention will hereinafter be described. The embodiment, however, is described merely by way of example. The present invention is not limited to the embodiment described below.

In the referential drawings, like symbols designate components having substantially like functions. The referential drawings are schematically illustrated, the dimensional ratios of objects illustrated in the drawings may differ from the actual dimensional ratios of the objects. The dimensional ratios of the objects may differ between the drawings. Specific dimensional ratios of the objects should be understood with reference to the following description.

(Structure of Cylindrical Lithium-Ion Secondary Battery)

Figure 2:
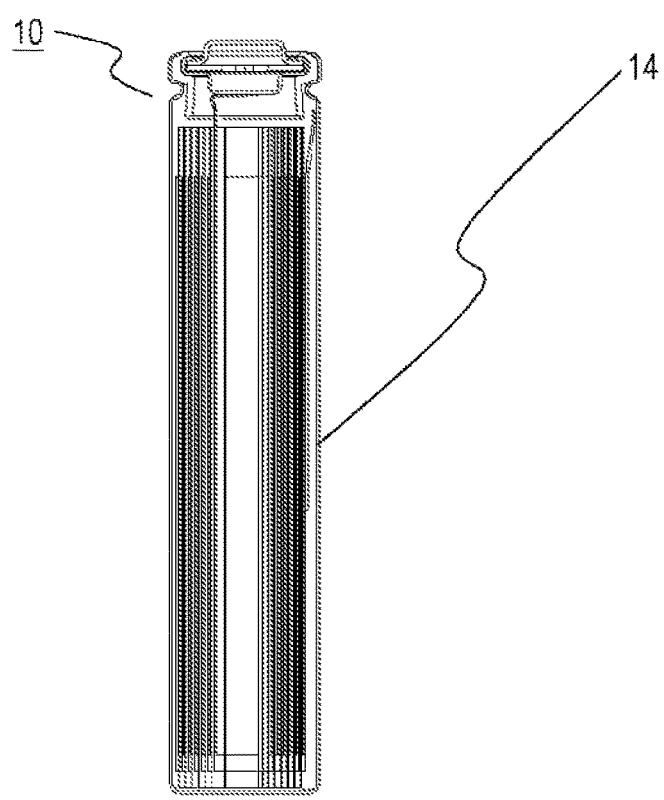
FIG. 2 is a sectional view of the cylindrical lithium-ion secondary battery according to the embodiment of the present invention.

The structure of the cylindrical lithium-ion secondary battery according to the embodiment of the present invention will be described with reference to FIG. 1 and FIG. 2.

A cylindrical lithium-ion secondary battery 10 includes an electrode group 23 formed in a manner in which a negative electrode 11, a positive electrode 12, and a separator 13 that isolates these electrodes from each other are wound, and a lithium-ion conducting electrolyte (simply referred to as "an electrolytic solution" below). The electrode group 23 and the electrolytic solution are contained in a battery case 14.

A negative electrode lead 19 and a positive electrode lead 20 are connected at an end thereof to the negative electrode 11 and the positive electrode 12, respectively. The negative electrode lead 19 and the positive electrode lead 20 are respectively connected to the battery case 14 and a sealing body 5 and extend to the outside of the battery case 14. The battery case 14 is made of a metal, and an opening portion 21 thereof is sealed by the sealing body 5 that includes a gasket 22 made of a resin material and a mechanism for suppressing an increase in the internal pressure of the battery and that has a function as a positive electrode terminal.

The sealing body 5 includes an upper lid 2 in a cap shape, a ring 1 having a through-hole, a valve member 4, and a lower lid 3. The ring 1 is in contact with the rim of the upper lid 2. The valve member 4 is in contact with the lower surface of the ring 1 so as to cover the through-hole of the ring 1. The lower lid 3 is in contact with the lower surface of the valve member 4. That is, the valve member 4 is interposed between the ring 1 and the lower lid 3. The lower lid 3 and the upper lid 2 are crimped so as to be electrically connected to each other. The sealing body 5 has the function as the positive electrode terminal.

The electrolytic solution is poured into the battery case 14 from the opening portion 21. The electrode group 23 is immersed into the electrolytic solution. The sealing body 5 and the gasket 22 are inserted into the opening portion 21 and crimped. The cylindrical lithium-ion battery in a sealed state is thus formed.

EXAMPLES

The present invention is described by using examples.

Experimental Example 1

[Manufacture of Positive Electrode]

A positive electrode mixture slurry was prepared in a manner in which a lithium cobalt oxide of a positive electrode active material, acetylene black powder, and polyvinylidene fluoride were mixed at a mass ratio of 95:2.5:2.5 in an N-methyl-2-pyrrolidone (NMP) solution. Then, the positive electrode mixture slurry was uniformly applied to both surfaces of a positive electrode current collector made of an aluminum foil, dried, and rolled by a roller to manufacture the positive electrode 12.

[Manufacture of Negative Electrode]

A negative electrode mixture slurry was prepared in a manner in which synthetic graphite of a negative electrode active material, sodium carboxymethyl cellulose, and styrene-butadiene rubber were mixed at a mass ratio of 98:1:1 in a solution. Then, the negative electrode mixture slurry was uniformly applied to both surfaces of a negative electrode current collector made of a copper foil, dried, and rolled by a roller to obtain the negative electrode 11.

[Preparation of Electrolytic Solution]

Lithium hexafluorophosphate ($LiPF_6$) was dissolved at a concentration of 1.0 mol/liter in a mixed solvent of ethylene carbonate (EC), methyl ethyl carbonate (MEC), and diethyl carbonate (DEC) that were mixed at a volume ratio of 3:5:2 to prepare a non-aqueous electrolytic solution.

[Manufacture of Sealing Body]

The upper lid 2 (outer diameter: 3.9 mm, thickness: 0.1 mm) and the lower lid 3 (outer diameter: 3.9 mm, thickness: 0.1 mm) were formed in a manner in which a pressing process was performed on a SOS plate. The film-like valve member 4 (outer diameter: 3.5 mm, thickness: 75 μm) was formed in a manner in which a pressing process was performed on a three-layered laminate material of modified polypropylene (thickness: 25 μm)/aluminum foil (thickness: 25 μm)/modified polypropylene (thickness: 25 μm). The ring 1 (outer diameter: 3.5 mm, thickness: 0.2 mm) was formed in a manner in which a pressing process was performed on a SUS plate.

The ring 1 had a through-hole 1a (opening area ratio: 0.35), and four protrusions 1b protruding toward the inside of the through-hole (angle of the protrusion tip (1f): 90°, protrusion height (1c): 0.37 mm) that were rotationally symmetric. The ridge line of the protrusions 1b was formed as a straight line. The protrusion height 1c corresponds to the height of a triangle having two sides meeting at a vertex of each of the protrusions 1b formed of linear ridge lines 1d and a base corresponding to a tangent 1e of left and right semicircle portions formed by punching in contact with the two sides.

As illustrated in FIG. 3, the valve member 4 was disposed on the upper surface of the lower lid 3, the ring 1 was disposed on the upper surface of the valve member 4, and the upper lid 2 was disposed on the upper surface of the ring 1. The sealing body 5 was then obtained by crimp sealing.

[Manufacture of Battery]

A positive electrode, a negative electrode, and two separators made of polyethylene fine porous films were used for manufacture of the electrode group. Leads were first attached to the positive and negative electrodes. The positive electrode 12 and the negative electrode 11 were caused to face each other with the separators 13 interposed therebetween so as to be insulated from each other. The positive electrode 12, the negative electrode 11, and the separators 13 were spirally wound by using a winding core to manufacture the electrode group 23.

The electrode group 23 and the electrolytic solution that were thus manufactured were inserted into the battery case 14 having an outer diameter of 4.5 mm and a thickness of 0.1 mm. After the sealing body 5 was disposed in the opening portion of the battery case 14 with the gasket 22 interposed therebetween, and crimp sealing was performed to manufacture a battery 1.

Experimental Example 2

A battery 2 was manufactured such that the number of the protrusions was 2, and the opening area ratio of the ring, the angle of the tip of the protrusions, and the height of the protrusions were the same as in the battery 1.

Experimental Example 3

A battery 3 was manufactured such that the number of the protrusions was 6, and the opening area ratio of the ring, the angle of the tip of the protrusions, and the height of the protrusions were the same as in the battery 1.

Experimental Example 4

A battery 4 was manufactured such that the number of the protrusions was 8, and the opening area ratio of the ring, the angle of the tip of the protrusions, and the height of the protrusions were the same as in the battery 1.

Experimental Example 5

A battery 5 was manufactured such that one protrusion was formed, and the opening area ratio of the ring, the angle of the tip of the protrusions, and the height of the protrusions were the same as in the battery 1.

Experimental Example 6

A battery 6 was manufactured such that no protrusions were formed, and the opening area ratio of the ring was the same as in the battery 1.

Experimental Example 7

A battery 7 was manufactured such that the outer diameter of the battery case was 10 mm, and the opening area ratio of the ring, the number of the protrusions, the angle of the tip of the protrusions, and the height of the protrusions were the same as in the battery 1.

Experimental Example 8

A battery 8 was manufactured such that the outer diameter of the battery case was 18 mm, the height of the battery was 65 mm, and the opening area ratio of the ring, the number of the protrusions, the angle of the tip of the protrusions, and the height of the protrusions were the same as in the battery 1.

Experimental Example 9

A battery 9 was manufactured such that the opening area ratio of the ring was 0.2, and the number of the protrusions, the angle of the tip of the protrusions, and the height of the protrusions were the same as in the battery 1.

Experimental Example 10

A battery 10 was manufactured such that the opening area ratio of the ring was 0.7, and the number of the protrusions, the angle of the tip of the protrusions and the height of the protrusions were the same as in the battery 1.

Experimental Example 11

A battery 11 was manufactured such that the opening area ratio of the ring was 0.1, the height of the protrusions was 0.24 mm, and the number of the protrusions, and the angle of the tip of the protrusions were the same as in the battery 1.

Experimental Example 12

A battery 12 was manufactured such that the angle of the tip of the protrusions was 30°, and the opening area ratio of the ring, the number of the protrusions, and the height of the protrusions were the same as in the battery 1.

Experimental Example 13

A battery 13 was manufactured such that the angle of the tip of the protrusions was 60°, and the opening area ratio of the ring, the number of the protrusions, and the height of the protrusions were the same as in the battery 1.

Experimental Example 14

A battery 14 was manufactured such that the angle of the tip of the protrusions was 120°, and the opening area ratio of the ring, the number of the protrusions, and the height of the protrusions were the same as in the battery 1.

Experimental Example 15

A battery 15 was manufactured such that the angle of the tip of the protrusions was 150°, the height of the protrusions was 0.24 mm, and the opening area ratio of the ring and the number of the protrusions were the same as in the battery 1.

Experimental Example 16

A battery 16 was manufactured such that the height of the protrusions was 0.2 mm, and the opening area ratio of the ring, the number of the protrusions, and the angle of the tip of the protrusions were the same as in the battery 1.

Experimental Example 17

A battery 17 was manufactured such that the height of the protrusions was 0.5 mm, and the opening area ratio of the ring, the number of the protrusions, and the angle of the tip of the protrusions were the same as in the battery 1.

Experimental Example 18

A battery 18 was manufactured such that the height of the protrusions was 0.8 mm, and the opening area ratio of the ring, the number of the protrusions, and the angle of the tip of the protrusions were the same as in the battery 1.
[Evaluating Method]

A battery-case bottom hole was formed in the lower surface of the battery case of each manufactured battery. A pressurizer including a pressure indicator was connected so as to cover and seal the battery-case bottom hole. Gas or liquid was used to pressurize the inside of the battery case 14 from the battery-case bottom hole. A value indicated by the pressure indicator when the valve member 4 cleaved was regarded as the operating pressure.

Table 1 illustrates the operating pressure of each valve member of the batteries 1 to 18 and the evaluation results.

The results were evaluated by the values of the operating pressure of the valve member. The case where the operating pressure of the valve member is no less than 1 MPa and no more than 10 Mpa is represented by "B" as a proper range. In particular, the case where the operating pressure of the valve member is no less than 2 Mpa and no more than 9 MPa is represented by "A" as a more proper range. The case where the operating pressure of the valve member is out of the above range is represented by "C" as an improper range".

As illustrated in the battery 1 to the battery 4, when the number of the protrusions of the ring was no less than 2 and no more than 8, the operating pressure of the valve member was stable in the range from 3.8 MPa to 4.3 MPa. In the case of this range, the proper height and strength of the protrusions were ensured. Accordingly, stress concentration occurred on the valve member at multi points when the internal pressure increased, and the operating pressure of the valve member was stable.

As illustrated in the battery 5, in the case where one protrusion was formed on the ring, the operating pressure of the valve member increased to 11 MPa. The reason is presumably that stress concentration occurred at the protrusion of the ring on the valve member at a single point when the internal pressure increased, and accordingly, the operating pressure was not sufficiently decreased, or sufficient stress concentration did not occur due to anisotropic deformation of the valve member, making the operating pressure unstable.

As illustrated in the battery 6, in the case where no protrusions were formed on the ring, the operating pressure of the valve member further increased to 12 MPa. The reason is presumably that since no protrusions were formed, the effect of the starting point of cleavage of the valve member was unlikely to be obtained.

As illustrated in the battery 1 and the battery 7, when the outer diameter of the battery case was 10 mm or less, the operating pressure of the valve member was 3.8 MPa in the battery 1, and 1.2 MPa in the battery 7. These pressures enabled an increase in the internal pressure to be avoided in an early stage of anomalies in the batteries.

In the case of the battery 8, the opening area of the ring was large, and the protrusions were formed. Accordingly, the operating pressure of the valve member decreased to 0.4 MPa. This is not preferable because the valve member may cleave at a pressure applied, for example, when the battery temperature increases even in a normal operation of the cylindrical lithium-ion secondary battery.

As illustrated in the battery 1, the battery 9, and the battery 10, when the opening area ratio of the ring was no less than 0.2 and no more than 0.7, the operating pressure of the valve member ranged from 3.8 MPa to 7.5 MPa, at which bursting of the battery case can be avoided.

TABLE 1

| Battery | Outer diameter of case (mm) | Opening area ratio of ring | Number of protrusions (number) | Angle of protrusion tip (°) | Protrusion height (mm) | Operating pressure (Mpa) | Evaluate |
|---|---|---|---|---|---|---|---|
| 1 | 4.5 | 0.35 | 4 | 90 | 0.37 | 3.8 | A |
| 2 | ↑ | ↑ | 2 | ↑ | ↑ | 4.3 | A |
| 3 | ↑ | ↑ | 6 | ↑ | ↑ | 4 | A |
| 4 | ↑ | ↑ | 8 | ↑ | ↑ | 4.3 | A |
| 5 | ↑ | ↑ | 1 | ↑ | ↑ | 11 | C |
| 6 | ↑ | ↑ | 0 | — | — | 12 | C |
| 7 | 10 | ↑ | 4 | 90 | 0.37 | 1.2 | B |
| 8 | 18 | ↑ | ↑ | ↑ | ↑ | 0.4 | C |
| 9 | 4.5 | 0.2 | ↑ | ↑ | ↑ | 7.5 | A |
| 10 | ↑ | 0.7 | ↑ | ↑ | ↑ | 5.5 | A |
| 11 | ↑ | 0.1 | ↑ | ↑ | 0.24 | 10 | B |
| 12 | ↑ | 0.35 | ↑ | 30 | 0.37 | 10 | B |
| 13 | ↑ | ↑ | ↑ | 60 | ↑ | 4 | A |
| 14 | ↑ | ↑ | ↑ | 120 | ↑ | 5 | A |
| 15 | ↑ | ↑ | ↑ | 150 | 0.24 | 8 | A |
| 16 | ↑ | ↑ | ↑ | 90 | 0.2 | 7.5 | A |
| 17 | ↑ | ↑ | ↑ | ↑ | 0.5 | 4 | A |
| 18 | ↑ | ↑ | ↑ | ↑ | 0.8 | 4.5 | A |

As illustrated in the battery 11, when the opening area ratio of the ring was 0.1, the operating pressure of the valve member was 10 MPa. In this case, the pressure may be insufficient to cleave the valve member, and gas released during valve action may cause the battery to burst before the valve member of the sealing body is actuated depending on the use and size of the battery.

As illustrated in the battery 1, the battery 13, and the battery 14, when the angles of the tips of the protrusions were 60°, 90°, and 120°, the operating pressures of the valve members were 4 MPa, 3.8 MPa, and 5 MPa. The reason is presumably that the strength of the protrusions enabled the protrusion tip to be inhibited from being deformed when the valve member was subjected to an increased internal pressure and stress concentration occurred at the tip of the protrusions, and stress concentration occurred on the valve member at the protrusion tip when the internal pressure increased, so that the effect of the starting point was obtained.

As illustrated in the battery 12, when the angle of the tip of the protrusions was 30°, the operating pressure was 10 MPa and met the standard, but the ring was deformed due to a lack of the strength of the protrusions.

As illustrated in the battery 15, when the angle of the tip of the protrusions was 150°, the operating pressure of the valve member increased to 8 MPa. This is presumably that sufficient stress concentration did not occur on the valve member at the protrusion tip when the internal pressure increased, and the effect of the starting point was reduced.

As illustrated in the battery 1, the battery 17, and the battery 18, when the heights of the protrusions of the rings were 0.37 mm, 0.5 mm, and 0.8 mm, the operating pressures of the valve members were 3.7 MPa, 4 MPa, and 4.5 MPa. The reason is presumably that stress concentration was likely to occur on each valve member at the protrusion tip when the internal pressure increased, and the operating pressure of the valve member decreased and was stable.

As illustrated in the battery 16, when the height of the protrusions of the ring was 0.2 mm, the operating pressure of the valve member was 7.5 MPa. The reason is presumably that stress concentration occurred at the protrusion tip was insufficient, and the operating pressure of the valve member increased.

INDUSTRIAL APPLICABILITY

The present invention can provide a small cylindrical metallic lithium-ion battery that includes a mechanism for suppressing an increase in the internal pressure of the battery and thus does not carry a risk of bursting of a battery case body when an anomaly occurs in the battery. The battery is useful for reliable wearable equipment that ensures the safety.

REFERENCE SIGNS LIST 1 ring
1a through-hole
1b protrusion
1c protrusion height
1d ridge line
1e tangent of semicircle portion
1f angle of protrusion tip
2 upper lid
2a upper lid height
3 lower lid
4 valve member
5 sealing body
10 cylindrical lithium-ion secondary battery
11 negative electrode
12 positive electrode
13 separator
14 battery case
19 negative electrode lead
20 positive electrode lead
21 opening portion
22 gasket
23 electrode group

The invention claimed is:

1. A cylindrical lithium-ion secondary battery comprising:
an electrode group that comprises a positive electrode, a negative electrode and a separator interposed between the positive electrode and the negative electrode, the positive electrode and the negative electrode being wound or stacked with the separator,
an electrolytic solution;
a battery case that has an outer diameter of 10 mm or less, and houses the electrode group and the electrolytic solution; and
a sealing body that comprises a ring and a valve member, the ring having a through-hole and protrusions that are formed of linear ridge lines and protrude toward an inside of the through-hole, the valve member being disposed to cover the through-hole and seal the battery case, the protrusions causing the valve member to cleave when internal pressure of the secondary battery reaches a predetermined pressure, wherein the protrusions comprise a first protrusion that is formed of a first linear ridge line and a second protrusion that is formed of a second linear ridge line, and the through-hole is disposed between the first linear ridge line and the second linear ridge line.

2. The cylindrical lithium-ion secondary battery according to claim 1, wherein an opening area ratio of the through-hole is no less than 0.2 and no more than 0.7.

3. The cylindrical lithium-ion secondary battery according to claim 1, wherein a material of the ring is at least one selected from a group consisting of a metal, a ceramic, and a metallic compound.

4. The cylindrical lithium-ion secondary battery according to claim 1, wherein the valve member is a multilayer body of a resin and a metal.

5. The cylindrical lithium-ion secondary battery according to claim 1, wherein the ring includes no less than 2 and no more than 8 of the protrusions.

6. The cylindrical lithium-ion secondary battery according to claim 1, wherein the protrusions are arranged so as to be rotationally symmetric.

7. The cylindrical lithium-ion secondary battery according to claim 1, wherein an angle of a tip of the protrusions is no less than 60° and no more than 120°.

8. The cylindrical lithium-ion secondary battery according to claim 1, wherein the protrusions have a height of no less than 0.25 mm and no more than 2.5 mm.

9. The cylindrical lithium-ion secondary battery according to claim 1, wherein the predetermined pressure is no less than 1 MPa and no more than 10 MPa.

* * * * *